US012676770B2

(12) United States Patent
Baum et al.

(10) Patent No.: US 12,676,770 B2
(45) Date of Patent: Jul. 7, 2026

(54) METHOD FOR IDENTIFYING A TECHNICAL DEVICE FUNCTION

(71) Applicant: DEERE & COMPANY, Moline, IL (US)

(72) Inventors: Bernd Baum, Dannstadt-Schauernheim (DE); Martin Schmidt, Mannheim (DE); Stephane Biziorek, Gray (FR)

(73) Assignee: Deere & Company, Moline, IL (US)

( * ) Notice: Subject to any disclaimer, the term of this patent is extended or adjusted under 35 U.S.C. 154(b) by 135 days.

(21) Appl. No.: 18/439,836

(22) Filed: Feb. 13, 2024

(65) Prior Publication Data

US 2024/0291686 A1      Aug. 29, 2024

(30) Foreign Application Priority Data

Feb. 27, 2023    (DE) .......................... 102023104691.8

(51) Int. Cl.
| | |
|---|---|
| *G08B 21/00* | (2006.01) |
| *A01B 76/00* | (2006.01) |
| *H04L 12/40* | (2006.01) |

(52) U.S. Cl.
CPC .............. *H04L 12/40* (2013.01); *A01B 76/00* (2013.01); *H04L 2012/40273* (2013.01)

(58) Field of Classification Search
CPC ........... H04L 12/40; H04L 2012/40273; A01B 76/00; G05B 2219/21089; G05B 2219/24012; G05B 2219/2663; G05B 19/0425
USPC ......................................................... 340/684
See application file for complete search history.

(56) References Cited

U.S. PATENT DOCUMENTS

| | | |
|---|---|---|
| 11,576,297 B2 | 2/2023 | Kale et al. |
| 2012/0253594 A1* | 10/2012 | Schreiber ............... G05G 9/047 |
| | | 701/36 |
| 2017/0039787 A1* | 2/2017 | Sukumaaran ........... G06T 11/60 |
| 2017/0300725 A1 | 10/2017 | Baum et al. |
| 2021/0372441 A1* | 12/2021 | Kale .................. G05B 19/4155 |

FOREIGN PATENT DOCUMENTS

| | | |
|---|---|---|
| CA | 2241523 | 12/1999 |
| EP | 2018981 A1 | 1/2009 |
| WO | WO 2016099257 A1 | 6/2016 |
| WO | WO 2019101418 A1 | 5/2019 |

OTHER PUBLICATIONS

European Search Report issued in Application No. 24153292.8, dated Jun. 10, 2024, 18 pages.

* cited by examiner

*Primary Examiner* — Mark S Rushing

(57) ABSTRACT

A method for identifying a technical function of an agricultural attachment connected to a connection interface of a vehicle, the connection interface including multiple vehicle connections and the agricultural attachment including multiple device connections, includes optically acquiring a connection configuration formed by a first of the multiple device connections being connected to a first of the multiple vehicle connections, assigning a predefined technical function of the first of the multiple device connections to the first of the multiple vehicle connections, and identifying the predefined technical function at the first of the multiple vehicle connections depending on configuration information regarding the assigned predefined technical function.

6 Claims, 2 Drawing Sheets

METHOD FOR IDENTIFYING A TECHNICAL DEVICE FUNCTION

CROSS-REFERENCE TO RELATED APPLICATIONS

This application claims priority to German Patent Application No. 102023104691.8, filed Feb. 27, 2023, which is hereby incorporated by reference.

FIELD OF THE DISCLOSURE

The disclosure relates to a method for identifying a technical device function, which is connected to a connection interface of a vehicle.

BACKGROUND

Vehicles having energy-generating systems, such as tractors having a diesel engine, often have vehicle connections, via which they can transmit system energy of the vehicle directly or in converted energy form to different devices. These devices may then be operated or activated from the vehicle.

SUMMARY

The disclosure is based on the object of simplifying the control of a device connected to the vehicle.

This object is achieved by a method having the features of one or more of the following embodiments.

Further advantageous refinements of the method according to the disclosure can be found in one or more of the following embodiments.

According to one embodiment, in a method for identifying a technical function of a device connected to a connection interface of a vehicle, multiple vehicle connections are provided at the connection interface and multiple device connections are provided at the device. At least one device connection is connected here to one of the vehicle connections present (e.g., pneumatically, fluidically, hydraulically, electrically).

The interconnected vehicle connections and device connections form a connection configuration which is optically acquired. A predefined technical function of the device connection is assigned to the vehicle connection connected to this device connection depending on the optically acquired connection configuration. Depending on all assignments of technical functions in this connection configuration, configuration information is provided, with the aid of which the technical function of the respective vehicle connection is identified.

In this way, information about which technical function is currently connected to which vehicle connection of the connection interface (e.g., pneumatically, fluidically, hydraulically, electrically) is provided using simple technical means. The operation of the respective connected device from the vehicle can thus be carried out in a simplified and automated manner. The provision of the item(s) of configuration information is also advantageous for control systems, which, on the one hand, have a data connection to the vehicle and, on the other hand, are designed to control devices. By means of the provided item(s) of configuration information, such a control system can control the assigned device in a simplified and at least partially independent manner.

The above-mentioned control system is designed, for example, as a so-called job computer, which can be connected via a bus system (for example, ISO, CAN) to the vehicle (for example, tractor) or its operating interface and can activate the assigned device (for example, agricultural attachment) in a simpler and automated manner with knowledge of the item(s) of configuration information.

The vehicle can be an agricultural utility vehicle, for example a tractor. The device can be designed for carrying out agricultural work. For example, the device is connected to the tractor as an attachment.

The vehicle can be selected and then represented by a vehicle-specific identifier before the optical acquisition of the connection configuration with respect to time, for example even before the connection of the device to the connection interface. Similarly, a device can also be selected, which is then represented by a device-specific identifier representing the device, to further carry out the method. The respective identifier can be generated or acquired by selecting a vehicle or a device (for example, by input in a selection menu). By using the respective identifier, the method can be applied in an unambiguous and automated manner to a specific vehicle and/or device. Vehicle-specific and/or device-specific data can be accessed in an automated manner by means of the identifier (for example, in a suitable data processing unit), in order to assist carrying out the method for identifying the technical function at the respective vehicle connection.

The vehicle-specific identifier is, for example, automatically generated by the application program or acquired via image data (for example, photograph of a nameplate, another code displayed in the vehicle, or a barcode, QR code) or via wireless data (for example, Bluetooth, Wi-Fi) and made available to the data processing unit.

The device-specific identifier is generated automatically by the application program, for example. Alternatively, this identifier is acquired, for example, via image data (for example, nameplate, barcode, QR code) or via wireless data (for example, Bluetooth, Wi-Fi) and made available to the above-mentioned data processing unit.

The identifier can also be used to generate vehicle-specific and/or device-specific data in the context of a training or initialization phase and to assign these data to the respective vehicle-specific and/or device-specific identifier. These data can then be automatically retrieved upon a connection configuration between a vehicle and a device connected thereto, in order to assist individual method steps for identifying the technical function at the respective vehicle connection.

Vehicle profile data are advantageously assigned to the vehicle, which represent at least one connection feature (e.g., color code, position, production information of the producer) of the vehicle connections of this vehicle. In this way, it is taken into consideration that the connection interface is designed differently for different vehicle types. By way of the assigned vehicle profile data, a unique vehicle profile with respect to the vehicle connections results, which can be stored and is retrievable again in the case of a connection configuration of this vehicle with a device. Therefore, the connection structure or the connection scheme of its connection interface is known for this vehicle. In this way, data relevant when carrying out the method can be provided in a technically simple and unambiguous manner.

The above-mentioned assignment of the vehicle profile data to a vehicle can take place in the context of a training or initialization phase, for example, by starting a specific application program. Individual vehicles can be acquired and created here in a data memory of a data processing unit and specific vehicle profile data can be assigned to the respectively created vehicle or its vehicle-specific identifier.

The vehicle profile data can be generated depending on an optical acquisition of the connection interface of the electronically created vehicle in the unconnected state (with respect to a device). For example, in this case one or more photographs of the connection interface or all vehicle connections are created. An image-processing program can identify and distinguish the vehicle connections and create the vehicle profile data therefrom.

The procedure of the optical acquisition of the connection interface can be carried out once. In one embodiment, the vehicle profile data can also be individually changed before they are assigned to the created vehicle.

In another embodiment, device profile data, which represent at least one connection feature of the device connections of this device, are assigned to the device-specific identifier. A device profile which is unique with respect to the device connections results by way of the assigned device profile data, which can be stored and is retrievable again in the case of a connection configuration of this device with a vehicle. In this way, data relevant when carrying out the method can be provided in a technically simple and unambiguous manner.

The above-mentioned assignment of the device profile data to a device-specific identifier can take place in the context of a training or initialization phase, for example, by starting a specific application program. Individual devices can be acquired and created here in a data memory of a data processing unit by means of the respective identifier. Specific device profile data can then be assigned to the respective device-specific identifier. All devices are advantageously created in succession which very generally come into consideration for a connection or which are to be taken into consideration for the connection to a specific vehicle.

The device profile data can be generated depending on an optical acquisition of the device connections in an unconnected state (with respect to a vehicle) of the acquired or created device. For example, in this case at least one photograph is created of each individual device connection and/or of all device connections together. The photographs can be created from different positions. An image-processing program can identify and distinguish the device connections and create the device profile data therefrom. In one embodiment, the device profile data can also be individually changed before they are assigned to the created device.

The procedure of the optical acquisition can be carried out once. If the connection features of individual device connections should change, the device profile data are updated depending on a renewed optical acquisition of the device connections.

A connection feature of a device connection is advantageously implemented in that this device connection includes an optical marking (for example, color and/or shape). For example, these are marking elements which are installable on the device connections in a technically simple manner and are unambiguously distinguishable from one another. The marking elements are distinguishable from one another, for example, by different colors and/or shapes. For example, the marking elements are available cost-effectively as standard components.

The connection feature can contain the predefined technical function of the device connection. The respective technical function is predefined, for example, in that a user identifies or defines the technical function of the respective device connection and then provides it for the device profile in the form of a data input (for example as text) via an operating interface.

For example, the technical function of the respective device connection is predefined in that, after the optical acquisition of the device connection or all device connections of the device, the respective technical function is assigned to the corresponding optical data or image data. This can take place in the above-described manner, in that additional information (for example, data input, text) is allocated to the optical data or image data of the respective device connection.

The method may advantageously be used if a vehicle having an energy-generating system (for example, electric motor, diesel engine) is to transmit system energy (directly or in converted form) to different connectable devices via its connection interface. In such applications, at least one vehicle connection is designed as an energy connection for energy output (e.g., electrically, pneumatically, hydraulically, fluidically) at a device connection.

For example, at least one device connection arranged at a connection line of the device is designed for energy intake (e.g., electrically, pneumatically, hydraulically, fluidically) from a vehicle connection.

To assist carrying out the method or at least individual method steps, an image data-generating unit and a data-processing unit can be provided. Both functional units can be formed physically combined or separately. They can be part of an identification device, which can be designed as a mobile device. This data generation and processing is advantageously carried out by means of components existing in standard form, for example, a smart phone having one or more specific program(s) for data processing.

The above and other features will become apparent from the following detailed description and accompanying drawings.

BRIEF DESCRIPTION OF THE DRAWINGS

The method according to the disclosure will be explained in more detail hereinafter on the basis of the appended drawings. Components of comparable or corresponding function are identified here by the same reference signs. In the figures.

DETAILED DESCRIPTION

The embodiments or implementations disclosed in the above drawings and the following detailed description are not intended to be exhaustive or to limit the present disclosure to these embodiments or implementations.

Figure 1:
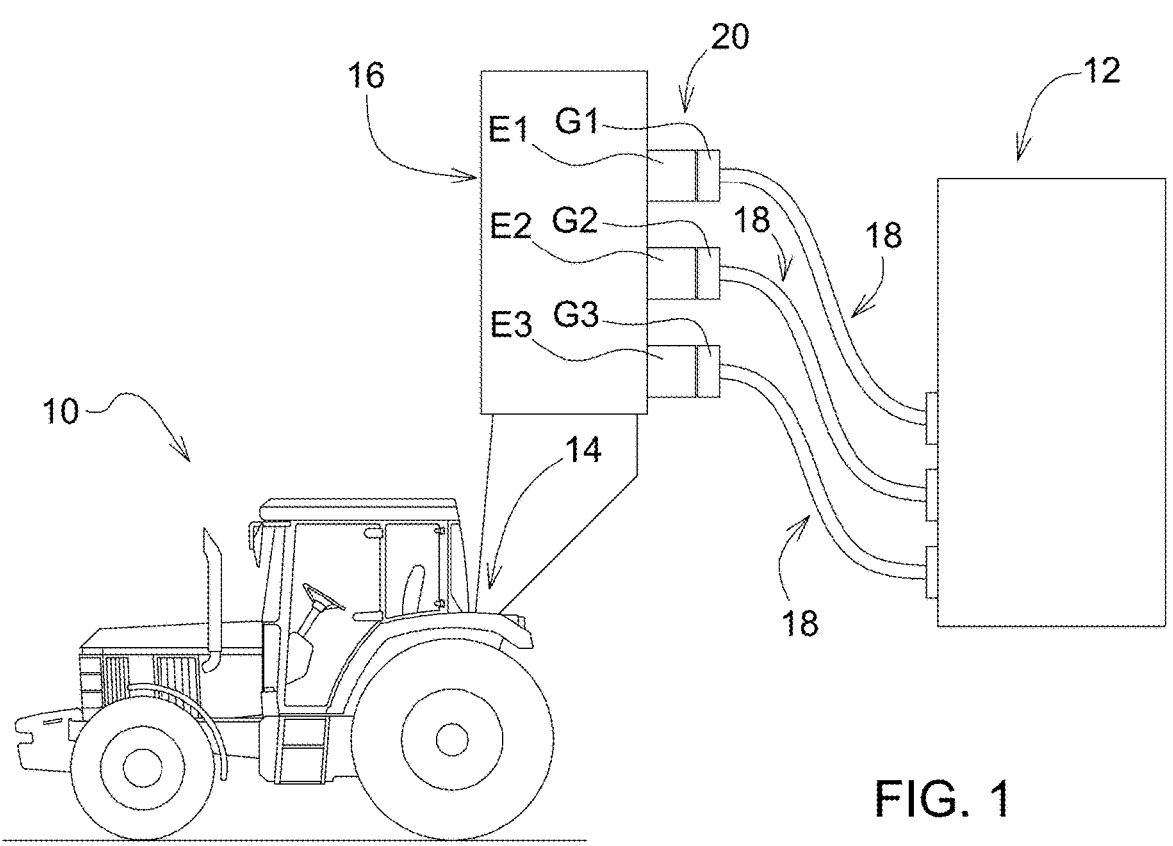
FIG. 1 shows a side view of a tractor and an attachment connected thereto.

FIG. 1 shows a vehicle in the form of a tractor 10 and a device connectable thereto in the form of an agricultural attachment 12. The tractor 10 includes a connection interface 16 in its rear region 14 for the connection. The interface is arranged more or less between the two rear tires of the tractor 10 and is therefore visually highlighted for better representation in the manner of an exploded drawing. The connection interface 16 and the attachment 12 are schematically shown in FIG. 1.

Figure 2:
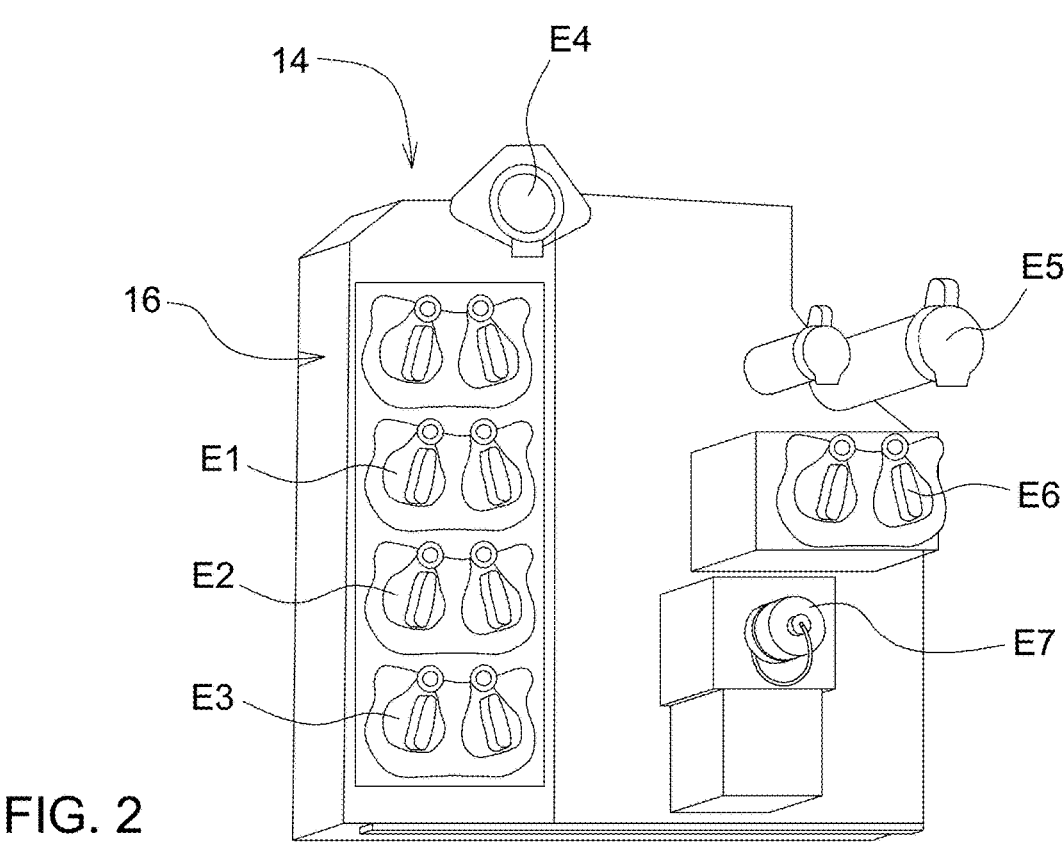
FIG. 2 shows a view of a connection interface in the rear region of the tractor according to FIG. 1.
Figure 3:
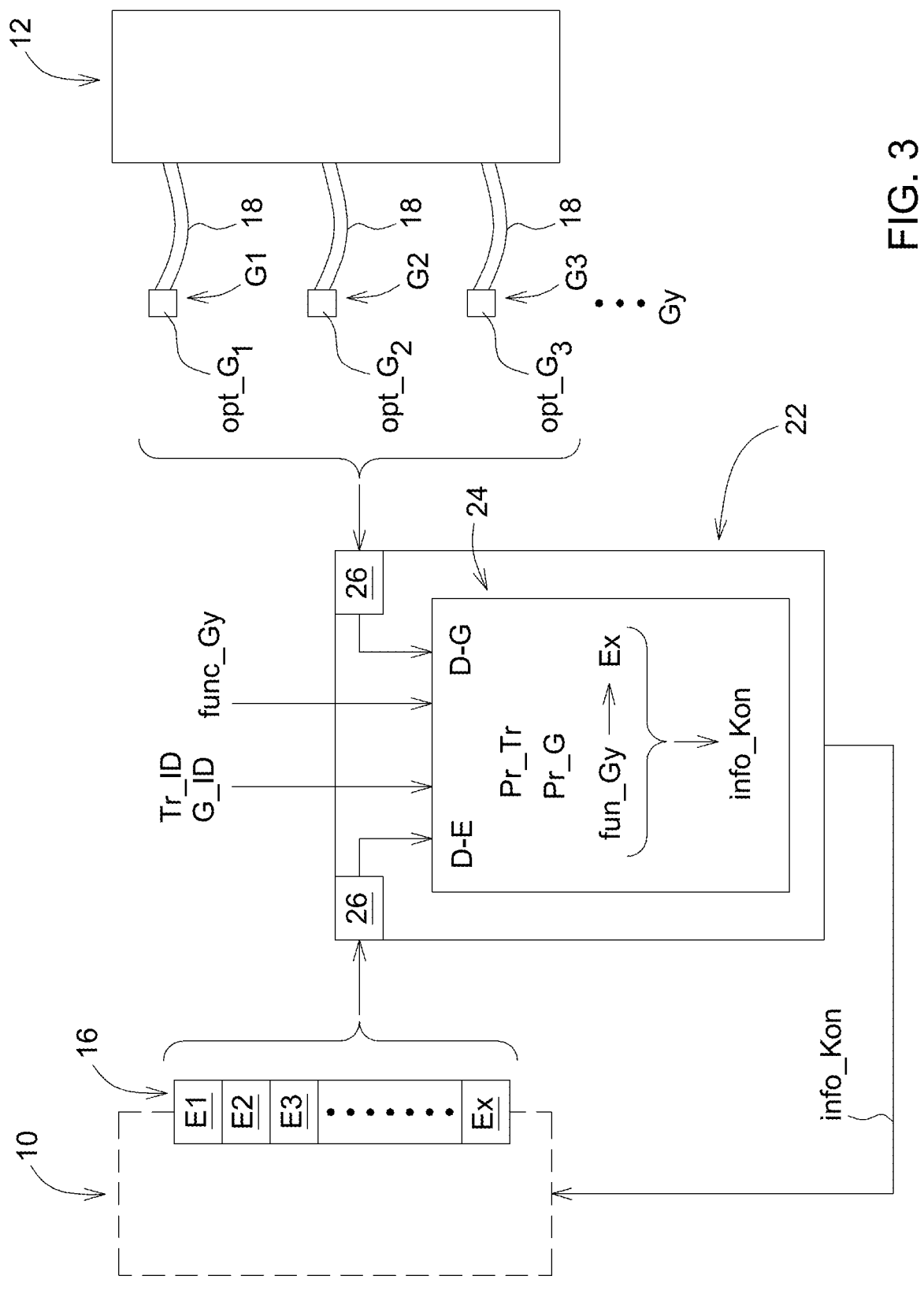
FIG. 3 shows a schematic block diagram of functional units for carrying out the method according to the disclosure.

In FIG. 2, the connection interface 16 is equipped with a plurality of vehicle connections E, for example E1 to Ex, wherein "x" is a natural number. A device connection G of the attachment 12 is connectable to each of the individual vehicle connections E. Of the possible device connections G1 to Gy ("y" is a natural number), three device connections G1, G2, G3 are shown by way of example in FIG. 1, which are each arranged at a line end of a line 18 of the attachment 12.

Energy generated by the tractor 10 can therefore be output at the attachment 12 via the vehicle connections E1 to Ex and the device connections G1 to Gy connected thereto. The vehicle connection Ex therefore acts as an energy connection for energy output at the device connection Gy, while the latter is arranged at a line end of the line 18 and is designed for energy intake from the vehicle connection Ex.

For example, the lines 18 are hydraulic lines, which transport hydraulic energy generated by a hydraulic system of the tractor 10 via the vehicle connections E-x to the attachment 12.

In the schematically shown connection configuration 20 according to FIG. 1, the three device connections G1, G2, G3 are connected to the respectively associated vehicle connection E1, E2, E3 as representative of differently possible connection configurations.

The method enables an identification of the current technical function at the respective vehicle connection Ex when the device (for example, the attachment 12) is connected to the vehicle (for example, to the tractor 10). An identification device 22, for example, a mobile device (e.g., a smartphone), having a data processing unit 24 (e.g., a controller having a processor and memory) and at least one camera 26 is provided for carrying out the method.

Initially, in a training or initialization phase of the method, a vehicle, for example, the tractor 10, is selected which comes into consideration for a later connection configuration with a device, for example, the attachment 12. Multiple different vehicles can also be selected in succession, which each later comes into consideration for a connection configuration with one device or different devices. Similarly, one device or multiple devices are also selected in the training or initialization phase of the method.

A vehicle-specific identifier Tr_ID and a device-specific identifier G_ID, which is stored in the identification device 22, are used for each of the vehicles or tractors 10 and devices or attachments 12 selected in the training or initialization phase. The respective identifier is, for example, automatically generated by an application program of the identification device 22 or input by the identification device 22 via image data (for example, photograph of a nameplate, another code displayed in the vehicle, or a barcode, QR code) or wireless data (for example, Bluetooth, Wi-Fi) during the selection.

The vehicle-specific identifier Tr_ID is assigned specific vehicle profile data Pr_Tr in the training or initialization phase. The latter are generated depending on an optical acquisition of the connection interface 16 of the tractor 10. The camera 26 generates image data D-E here, which are processed in the data processing unit 24 and then assigned to the identifier Tr_ID as vehicle profile data Pr_Tr. During this optical acquisition, the connection interface 16 is free of device connections Gy, i.e., the tractor 10 is in an unconnected state with respect to the attachment 12.

The vehicle profile data Pr_Tr represent at least one connection feature (e.g., color code, position, production information of the producer) of the vehicle connections Ex of this tractor 10. Optionally, the vehicle profile data Pr_Tr can also be corrected.

Similarly, the device-specific identifier G_ID is also assigned specific device profile data Pr_G in the training or initialization phase. The latter are generated depending on an optical acquisition of the device connections Gy of the attachment 12. The camera 26 generates image data D-G here, which are processed in the data processing unit 24 and then assigned to the identifier Tr_G as device profile data Pr_G. During this optical acquisition, the device connections Gy are not connected to any vehicle connections Ex, i.e., the attachment 12 is in an unconnected state with respect to the tractor 10.

The device profile data Pr_G represent at least one connection feature of the device connections Gy of this attachment 12. Optionally, the vehicle profile data Pr_Tr can also be corrected.

For optical identification, each device connection Gy includes an optical marking opt_Gy (for example, color or shape due to installed components), which can be used as a connection feature. A predefined technical function func_Gy of the respective device connection Gy is used as a further connection feature. The specific technical function func_Gy is predefined in that after the optical acquisition of the device connection Gy or all device connections Gy, the specific technical function func_Gy is assigned to the respective device connection Gy. This is carried out, for example, by a corresponding data input at the identification device 22.

As already mentioned, the interconnected vehicle connections Ex and device connections Gy form the specific connection configuration 20 between the tractor 10 and an attachment 12 connected thereto. For example, a user connects the device connections Gy to the desired vehicle connections Ex of the tractor 10 such that device connections Gy having a specific color code are connected to vehicle connections Ex of the same color.

It can already be known before the formation of the connection configuration 20 in the identification device 22 which tractor 10 and which attachment 12 are to be connected to one another. For this purpose, the user selects the tractor 10 and the attachment 12, for example, by a corresponding data input at the identification device 22. Since this tractor 10 and this attachment 12 are already created by means of their identification Tr_ID or G_ID, respectively, the correspondingly assigned vehicle profile data Pr_Tr and device profile data Pr_G can automatically be retrieved and made available for data processing in combination with the specific connection configuration 20.

The connection configuration 20 present is optically acquired by means of the camera 26. For example, the user creates multiple images of the interconnected device connections Gy and vehicle connections Ex by means of the camera 26 from various angles. A successful identification of the connections Gy, Ex can be optically and/or acoustically signaled by the identification device.

Depending on the successfully optically acquired connection configuration 20, the predefined technical function func_Gy of the respective device connection Gy is assigned to the vehicle connection Ex connected thereto. If all assignments of the technical functions func_Gy have taken place, configuration information info_Kon is provided depending on these assignments, which contains the technical function func_Gy at the respective vehicle connection Ex. In this way, the user can directly identify the technical function func_Gy at the respective vehicle connection Ex.

For example, the assignments carried out are confirmed by the user at the identification device 22. After the confirmation, the configuration information info_Kon can be transferred to the tractor 10, for example, displayed on a display unit in the driver's cab. The user can then operate the attachment 12 directly from the tractor 10 via the displayed technical functions func_Gy and does not have to know which line 18 is connected to which vehicle connection Ex.

For the sake of good order, it is to be noted that all illustrated details and components are not necessarily disclosed to scale. Individual details are sometimes shown schematically and/or not to scale.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for identifying a technical function of an agricultural attachment connected to a connection interface of a vehicle, the connection interface including multiple vehicle connections and the agricultural attachment including multiple device connections, comprising:

selecting via a data processing unit, included in a mobile device, the vehicle via a vehicle-specific identifier representing the selected vehicle;

selecting via the data processing unit the agricultural attachment via a device-specific identifier representing the selected agricultural attachment;

generating via the data processing unit vehicle profile data depending on an optical acquisition via a camera, included in the mobile device, of the multiple vehicle connections of the vehicle in an unconnected state with respect to the agricultural attachment;

assigning via the data processing unit the vehicle profile data to the vehicle-specific identifier, the vehicle profile data representing at least one connection feature of a first of the multiple vehicle connections;

generating via the data processing unit device profile data depending on an optical acquisition via the camera of the multiple device connections of the agricultural attachment in an unconnected state with respect to the vehicle;

assigning via the data processing unit the device profile data to the device-specific identifier, the device profile data represent at least one connection feature of a first of the multiple device connections;

optically acquiring via the camera a plurality of images from different angles of a connection configuration formed by the first of the multiple device connections being connected to the first of the multiple vehicle connections;

signaling by one or more of optically or acoustically via the data processing unit a successful identification of the connection configuration;

assigning via the data processing unit a predefined technical function of the first of the multiple device connections to the first of the multiple vehicle connections after the optical acquisition via the camera of the connection configuration;

receiving via the data processing unit confirmation of the assigned predefined technical function;

identifying via the data processing unit the predefined technical function at the first of the multiple vehicle connections depending on configuration information regarding the assigned predefined technical function; and transferring via the data processing unit the configuration information from the mobile device to the vehicle.

2. The method of claim 1, wherein the at least one connection feature includes an optical marking of the multiple device connections.

3. The method of claim 1, wherein the first of the multiple vehicle connections includes an energy connection configured for energy output to the first of the multiple device connections, which is configured for energy intake from the first of the multiple vehicle connections.

4. A system for identifying a technical function of an agricultural attachment connected to a connection interface of a vehicle, the connection interface including multiple vehicle connections and the agricultural attachment including multiple device connections, comprising:

a camera, included in a mobile device, configured to optically acquire the multiple vehicle connections of the vehicle in an unconnected state with respect to the agricultural attachment, optically acquire the multiple device connections of the agricultural attachment in an unconnected state with respect to the vehicle, and optically acquire a plurality of images from different angles of a connection configuration formed by a first of the multiple device connections being connected to a first of the multiple vehicle connections; and a data processing unit, included in the mobile device, configured to select the vehicle via a vehicle-specific identifier representing the selected vehicle, select the agricultural attachment via a device-specific identifier representing the selected agricultural attachment, generate vehicle profile data depending on the optical acquisition via the camera of the multiple vehicle connections of the vehicle in an unconnected state with respect to the agricultural attachment, assign the vehicle profile data to the vehicle-specific identifier, the vehicle profile data representing at least one connection feature of the first of the multiple vehicle connections, generate device profile data depending on the optical acquisition via the camera of the multiple device connections of the agricultural attachment in an unconnected state with respect to the vehicle, assign the device profile data to the device-specific identifier, the device profile data representing at least one connection feature of the first of the multiple device connections, signal by one or more of optically or acoustically a successful identification of the connection configuration, assign a predefined technical function of the first of the multiple device connections to the first of the multiple vehicle connections after the optical acquisition via the camera of the connection configuration, receive confirmation of the assigned predefined technical function, identify the predefined technical function at the first of the multiple vehicle connections depending on configuration information regarding the assigned predefined technical function, and transfer the configuration information from the mobile device to the vehicle.

5. The system of claim 4, wherein the at least one connection feature includes an optical marking of the multiple device connections.

6. The system of claim 4, wherein the first of the multiple vehicle connections includes an energy connection configured for energy output to the first of the multiple device connections, which is configured for energy intake from the first of the multiple vehicle connections.

* * * * *